United States Patent [19]

Canziani

[11] Patent Number: 4,938,335
[45] Date of Patent: * Jul. 3, 1990

[54] METHOD AND DEVICES FOR CONTROLLING THE UNLOADING OF THE ITEMS IN AN AUTOMATIC SORTING PLANT

[76] Inventor: Francesco Canziani, Via Contardo Ferrini 21, San Macario (Varese), Italy

[*] Notice: The portion of the term of this patent subsequent to Jan. 31, 2006 has been disclaimed.

[21] Appl. No.: 240,916

[22] Filed: Sep. 6, 1988

[30] Foreign Application Priority Data

May 23, 1988 [IT] Italy ................................ 2069 A/88

[51] Int. Cl.⁵ .................................................. B65G 47/46
[52] U.S. Cl. ....................................... 198/365; 198/372
[58] Field of Search ............... 198/356, 365, 372, 854, 198/855, 505, 502.4

[56] References Cited

U.S. PATENT DOCUMENTS

| | | | |
|---|---|---|---|
| 4,096,936 | 6/1978 | Nielsen ............................ | 198/365 X |
| 4,326,624 | 4/1982 | Ewertowski et al. ............ | 198/372 X |
| 4,399,904 | 8/1983 | Canziani ......................... | 198/854 X |
| 4,781,281 | 11/1988 | Canziani ........................ | 198/365 |
| 4,801,000 | 1/1989 | Canziani ........................ | 198/365 |
| 4,815,582 | 3/1989 | Canziani ........................ | 198/365 |

FOREIGN PATENT DOCUMENTS

| | | | |
|---|---|---|---|
| 971503 | 7/1975 | Canada .......................... | 198/365 |
| 0234653 | 9/1987 | European Pat. Off. ........... | 198/372 |
| 0141310 | 9/1982 | Japan ............................ | 198/502.4 |
| 1252256 | 8/1986 | U.S.S.R. ......................... | 198/502.4 |
| 2111933 | 7/1983 | United Kingdom ............. | 198/365 |
| 2184416 | 6/1987 | United Kingdom ............. | 198/365 |

Primary Examiner—David A. Bucci
Assistant Examiner—D. Glenn Dayoan
Attorney, Agent, or Firm—Notaro & Michalos

[57] ABSTRACT

The invention relates to a method and the relevant devices for controlling the unloading functions in sorting plants of the kind comprising a plurality of carriages, each of which is provided with a revolving belt suitable to move orthogonally to the direction of feed in order to effect the unloading of the items, wherein the controlling devices act upon the belt acceleration during the unloading stage, in order to adjust the belt speed to the mass of the items to be unloaded.

8 Claims, 8 Drawing Sheets

METHOD AND DEVICES FOR CONTROLLING THE UNLOADING OF THE ITEMS IN AN AUTOMATIC SORTING PLANT

FIELD AND BACKGROUND OF THE INVENTION

The invention relates to a method and relevant devices for controlling the unloading operations in sorting plants of the kind employed where considerable numbers of items are to be treated, e.g. in post offices, in mail order companies and the like.

These are plants where the different functions are carried out and synchronized by a central computer that controls the course of the operations.

A standard plant of this type comprises a fixed path along which run a plurality of carriages or "units" on which the items to be sorted are placed. The items are automatically unloaded when the relevant carriage passes before a determined collecting area when the item is being introduced in the apparatus, by means of computer controlled and actuated devices.

Plants of this kind are described in the following Italian patents and/or applications by the same Applicant: Italian Pat. No. 1 152 067; Italian Pat. No. 1 151 648; Italian utility Model No. 180 770; Italian App. Nos. 22476 C/83, 21310 B/85, 24227 B/85, 28859 A/81, 21774 B/82, 23110 A/84. 22264 A/84 and 20779 A/85. Each item is coded by an operator and placed on the sorting path in loading stations the number of which varies as a function of the amount of items to be sorted.

The path is developed to have various shapes and sizes. A train of units occupies either the whole path or just a part thereof.

The units are set in motion—according to methods known in the prior art—for instance by means of a continuous driving chain (when the path is substantially a rectilinear one) or by means of electric motors set on board the units themselves and fed by power bars parallel to the path (when the path is a carrousel).

The items, conveyed by the units, reach the collecting stations where The items, conveyed they are unloaded. The unloading is effected by means of movable belts that constitute the loading surface of the units. At the moment of unloading, the unit belt is actuated by sending a voltage signal to the relevant motor by means of bus bars in order to enable the drive control of only that belt-unit which is involved in the unloading. Bus bars are sectioned to correspond to the unloading station and are thus different from power bars for actually powering the motor. The unloading may take place at either side of the sorting path by simply reversing the direction of rotation of the belt, whose direction of rotation is perpendicular to the direction of unit motion.

SUMMARY OF THE INVENTION

An object of the present method is that of increasing the precision and the reliability of this kind of sorting plants in order to increase their precision during unloading.

More specifically, the invention method concerns the control of both the speed and the unloading trajectories in order to get all the items that are to be sorted to move as constantly as possible with respect to different speeds of the unit train.

BRIEF DESCRIPTION OF THE DRAWINGS

The invention will now be described in detail with reference to the following drawings, in which.

DESCRIPTION OF THE PREFERRED EMBODIMENT

The items handled by a sorting plant have, to a certain extent, different sizes and masses. The prior art methods for discharging the items from the units do not take this into account, whether they are based on unloading by gravitational force, (e.g. tiltable plate units) or when the unit has a loading surface consisting of a movable belt. These methods just synchronize unloading with the coding given to the item, making it necessary, thus, to employ collecting mouths which are larger than the ones traditionally used, in order to ensure that unloading takes place to the proper station.

According to the present method, instead, the unloading trajectories are controlled as a function of the mass of the single items.

What is requisite is to act upon the acceleration of the unit belt during unloading, so as to obtain a belt speed which as constant as possible, from the condition where the item has minimum mass (that is the smallest item) to the condition of maximum allowed mass.

In fact, should the unit belt be subjected to the same acceleration apart from the mass it conveys, the unloading trajectories become constant and predictable, which is all the more significant if one considers that there are good chances for the item to arrive at the unloading zone at the center of the unit.

The main advantages of this invention consist in the possibility of setting up contiguous and relatively small size unloading stations without this giving rise to any sorting errors and, consequently, to any hand rectification interventions.

It should be pointed out that during operation both the weight and the sizes of the items are detected, by known means, and the relevant data are sent to a computer that controls the whole apparatus.

Figure 1:
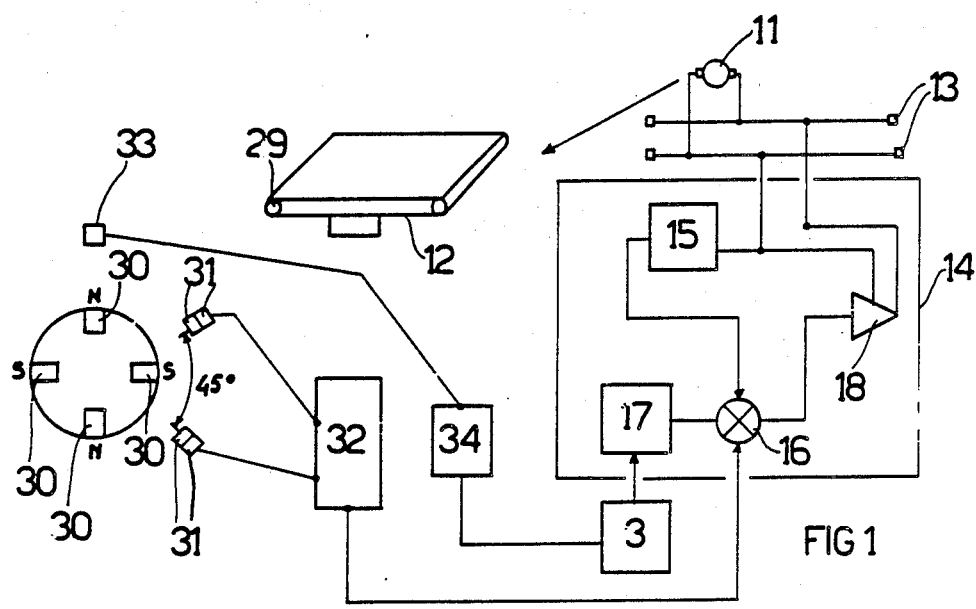
FIG. 1 is a block diagram of the actuating devices that enable the control of trajectories during unloading.

With reference to FIG. 1, the control of the unloading trajectories may be described in this manner. The unload unit has a belt 12 which rides on a roller 29, that represents the idle roller or the idler of the unit unloading belt. Four permanent magnets 30, e.g. of the cobalt or alnico type, having a high magnetization degree are mounted on the roller 29. These magnets are set along the periphery of the roller at 90° to each other, so that the magnetic polarities (N=north and S=south) alternate.

As roller 29 rotates along with the belt-unit, there occurs a variation in the magnetic flow produced by magnets 30, which is detected by the unit sensors 31 which are mounted on the belt-unit.

These are, for instance, Hall sensors that generate an electric signal as a in function of the flow variation of the magnetic fields and therfore of the speed of the belt-unit. This electric signal is sent to amplifier 32.

From amplifier S2 the signal is sent to a node 16 of a drive control 14, which node will compare said signal to that of a ramp generator 17. Drive control 14 controls the signal with which motor 11 should be fed to obtain a constant acceleration of belt 12 for all the unloaded articles.

For instance, should the unit be carrying an item having a considerable mass, the belt would be somewhat hindered in its motion.

Node 16 would thus receive a signal which is different than that of generator 17, as belt 12 (and therefore roller 29) has a lower acceleration than that foreseen.

In this case, drive control 14, by means of an amplifier 18 and a feedback 15, feeds the control signal to motor 11 earlier until a correspondence between the signal of generator 17 and that from amplifier 32 and its sensors 31 is reached. In FIG. 1 and, just by way of example, four Hall sensors are arranged in a two by two configuration so that 16 impulses are available for each complete revolution of the roller 29, and therefore an acceptable solution is achieved. Sensors 31, moreover, are arranged as to form a 45° angle, corresponding to a phase shift of 90° of the magnet-generated signals.

The same magnets 30 are further employed to test the proper working of the belt-unit.

To this end, there is used another Hall sensor 33, set on the ground near the path along which the units run and at a test station along the path.

The signal detected by sensor 33 at the test station is sent to device S4 that converts said signal, of the impelling kind, into a signal that is function of the speed of the belt-unit with respect to the ground.

The speed value is sent from converter S4 to computer 3, that checks that said value correspond to determined parameters for the operation of the belt-unit.

By this test it is possible to identify those units that, owing to a failure, are not in a position to carry out the unloading operation. These units are left out of the sorting operations and subjected to repair. The same test also sets off an alarm in the case of an item being particularly heavy and not being unloaded: the belt-unit would tend to slip on the driven roller in such a case.

Figure 2:
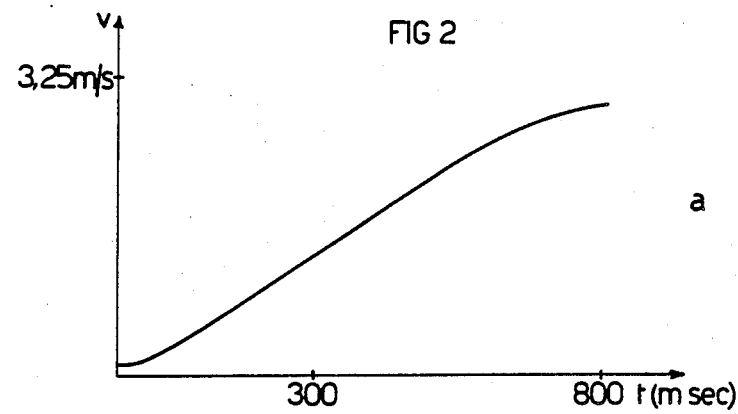
FIG. 2 is a set of graphs that illustrate the acceleration to which the items are being subjected during unloading.
Figure 2:
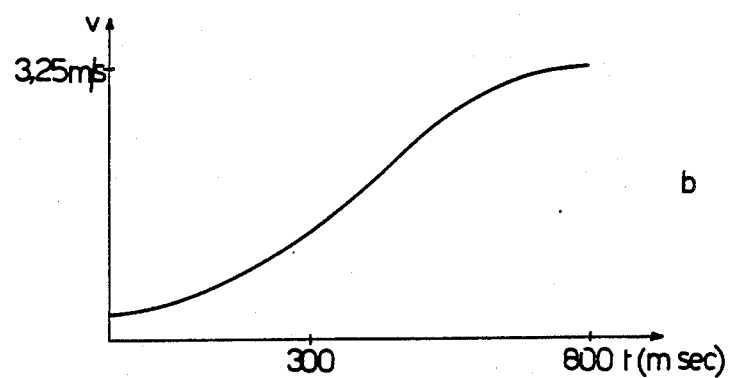
Figure 2:
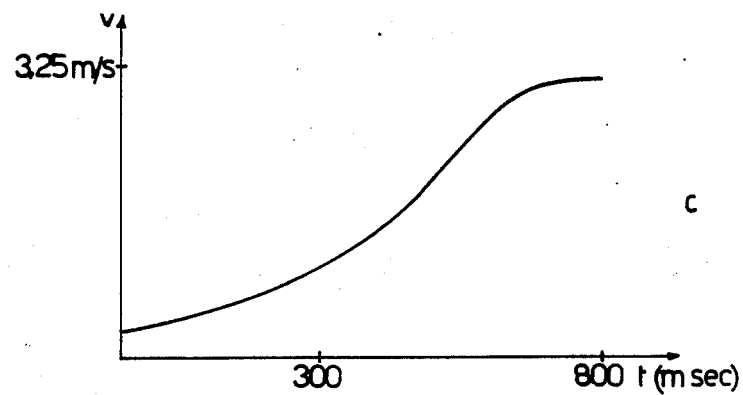

As proof of the actual usefulness of the invention, FIG. 2 shows the belt acceleration under three different working conditions.

The curves of FIG. 2 were the result of real working conditions. The data shared by the three curves are as follows: the belt actuation time (800 msec); the final speed of the belt (3.25 m/s) and; the instant when the items are being unloaded (after 300 msec from actuation). The most significant part of the curve is therefore the one comprised in the initial 300 msec during which the unloading takes place.

Curves a, b and c in FIG. 2, respectively illustrate the cases where the unit is unloaded (curve a), the unit is loaded with 5 Kg. (curve b) and to the unit is loaded with 10 Kg (curve c). By comparing the three curves over the first 300 msec, the increase in speed turns out to be the same in the three cases. This means that any item ranging between zero mass and 10 Kg mass is subject to the same acceleration, which results in the discharge speed and trajectories being constant and therefore calculable with precision.

The part of the curve comprised between 300 and 800 msec shows on the contrary a different trend in each single case; in fact, in the a condition the belt always revolves unloaded and therefore there is a constant increase in speed over 800 msec, whilst both in the b and in the c conditions the curves show a pitch after 300 msec, after the item has been unloaded and the belt runs without any load.

Figure 3C:
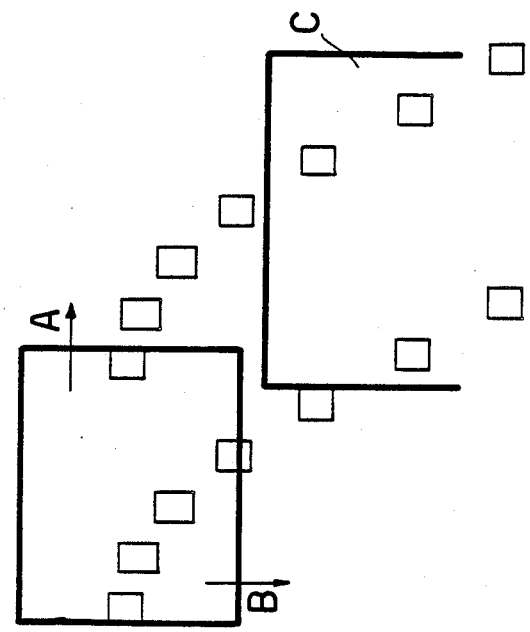
FIGS. 3a–3c show the unloading trajectories of the items in the collecting stations.
Figure 3A:
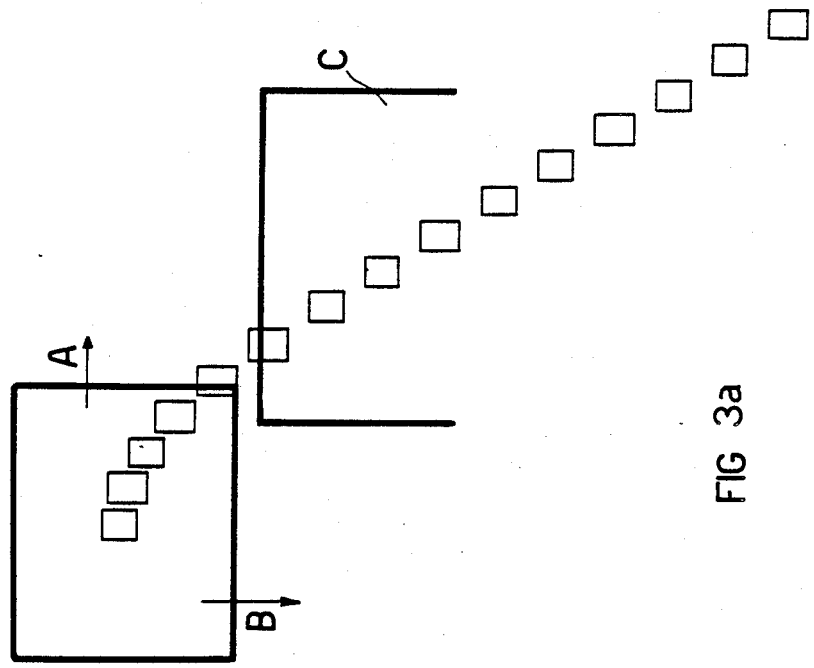
Figure 3B:
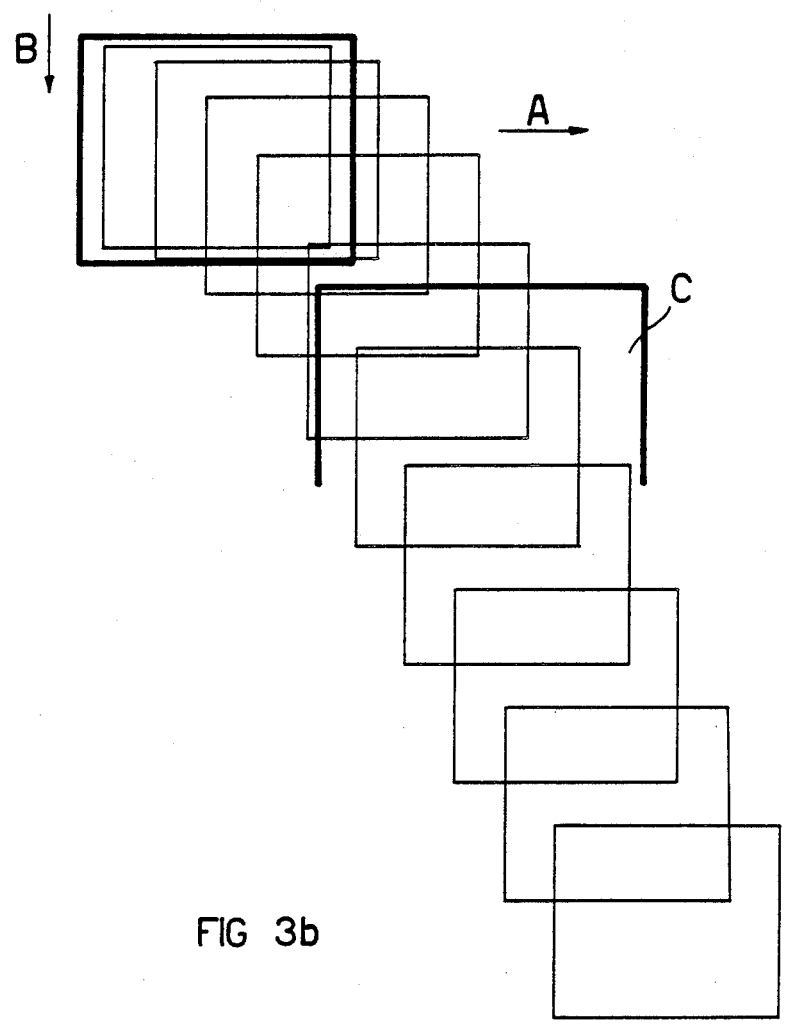

FIGS. 3a and 3b show the unloading trajectories, respectively, of a small size item (5 cm on a side in FIG. 3a) and of an item whose sizes may be compared to those of the loading surface of the unit (FIG. 3b). These trajectories were obtained by a computer simulation of a read situation.

In the same Figures the details relating to the unloading simulation, are set out the acceleration given by the belt-unit to the item being equal to 14.8 m/s$^2$, for either representation.

The constant trajectories will be apparent if one considers (see FIG. 3) that the largest size item seems not to get perfectly into the collecting station cowing to the fact that the unit motion cannot be shown in the drawing.

FIG. 3c shows the trajectories of a small size item that occupies two extreme positions on the unit. In this case also the acceleration value is equal to 14.8 m/s$^2$ and the constant unloading trajectories make it possible to unload the item exaclty to the relative collecting station.

In FIGS. 3a to 3c the unit moves along the path in direction A and the belt of the unit moves in direction B.

As in FIG. 3b, there is no evidence of the unit motion, which gives one the impression that the item on the left side of the unit would not get into the collecting mouth.

Another advantage of the present method lies in the possibility of unloading the items even when the sorting plant does not work at rated speed.

The units of the sorting plant are handled from the rest position to a working speed that is kept constant as the operations are being carried out. Said operations do not start until reaching the working speed, in the relatively short time of 15–20 sec. It may occur that, due to an emergency or a failure, the plant is deactivated after the units have been loaded and, once the emergency has ceased or the failure has been repaired, the plant is started again.

The time necessary for recovering the working speed is equal to the already cited one, but in this case it is relatively long, as it is possible that the already loaded items reach in the meantime the unloading stations.

It is thus necessary to bring the suspended operations to an end, without this affecting in the least the sorting precision.

According to the prior art, this drawback is usually obviated by discarding those items that reach the unloading stations before the plant is again working at a normal speed rate.

The discarded items will then be put again in the sorting path following the customary loading operations.

On the contrary, the invention method makes it possible to actuate the unit belt in a variable manner, as a function of the speed of the unit train. This is very important as a momentary stoppage of the plant does not involve any repetition of already effected operations, but the sorting precision and reliablity are ensured.

Figure 4:
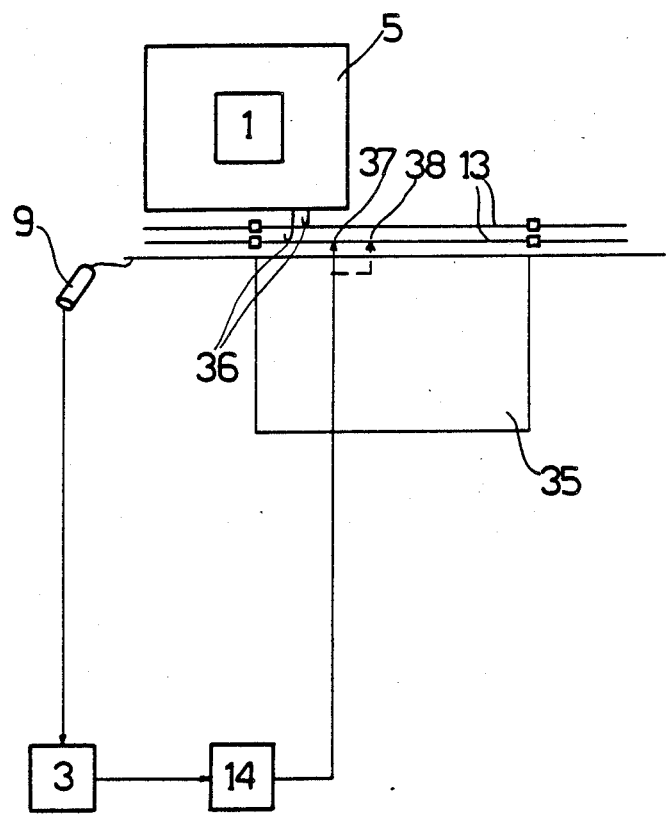
FIG. 4 is a block diagram of the drive control devices of the belt during unloading, which opoerate as a function of the machine speed.

FIG. 4 shows a unit 5 in the proximity of an unloading station 35 where item 1 is to be unloaded. According to the invention, the unloading takes place by providing the control signal to bars 13, from which the belt-unit motor is fed with the voltage through sliding contacts 36.

When the unit speed is lower than the working speed (e.g. owing to a momentary stoppage) the method according to the invention permits the unloading operation to take place all the same, in the following way.

The central computer 3 receives from a main encoder 9 a sequence of impulses corresponding to the unit speed, e.g. lower than the working speed. The computer compares then the speed value with the data inserted in its program and establishes that the motor of the belt-unit should be actuated by a certain delay.

Said delay causes the signal to be sent to bars 13, through the drive control 14, when unit 5, and therefore sliding contacts 36, are in a more advanced position then is usual.

It ensues that, if at working speed conditions the drive control 14 acts as the first sliding contact S8 is in correspondence with point 37, at lower speed conditions the same drive control will send the signal to bars 13 when said sliding contact is in a more advanced position, e.g. at point 38.

In consideration of the lesser speed of the units, this delayed actuation produces a predictable unloading trajectory and, accordingly, the unloading precision provided by the present method.

Figure 5A:
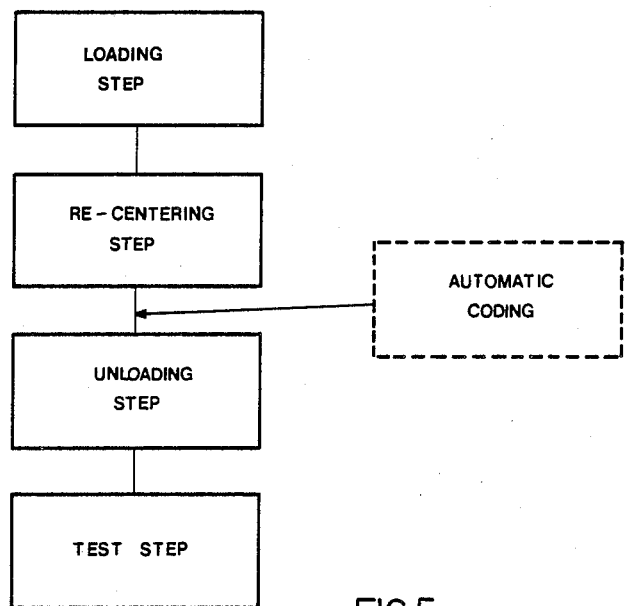
FIGS. 5a–5c show the flow diagrams relevant to the functions carried out according to the subject method.
Figure 5B:
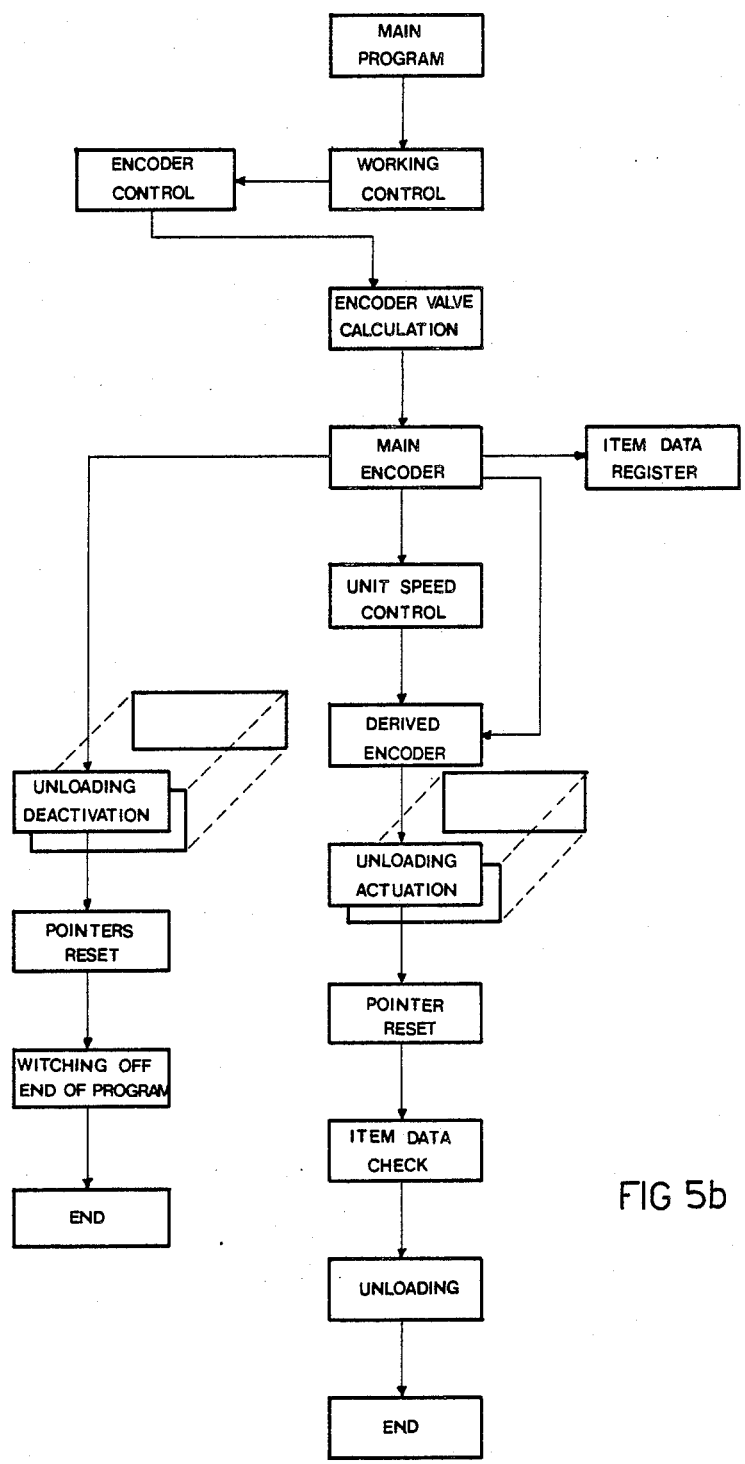
Figure 5C:
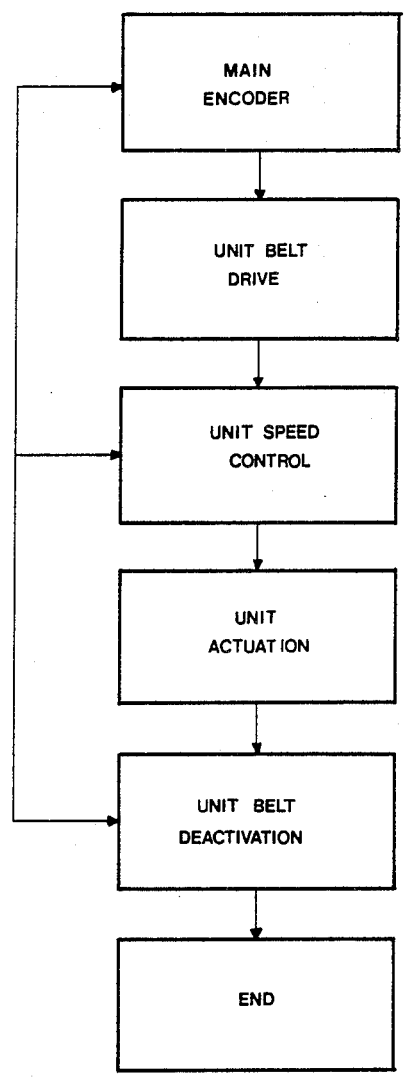

FIGS. 5a-5c show the flow diagrams relevant to the main functions carried out by the sorting plant which is the subject of the present method.

FIG. 5a refers to the main functions of the present method, namely the sequence of the loading, re-positioning at the unit center and unloading of the articles to be sorted, as well as the test for checking the proper working of the unit belts.

The "automatic coding" diagram indicates the possibility of avoiding the coding operations carried out by the operator, which is obtained by providing the plant with an automatic code reader or scanner (e.g. post code or bar code) placed before the unloading area.

In this way the scanner would automatically scan the destination of the items and would provide the central computer with the necessary data for the unloading step.

FIG. 5b refers to the control of the main encoder, and to the unloading stage of the items.

The main encoder is handled by four main blocks, namely a main program, the control program for a proper working of the plant, the handling program and the encoder value computing program.

The main encoder, in turn, sorts the tasks to be carried out as a function of the encoder value, and updates the item data on the suitable shift register. The "unit speed control" represents the computing of the unit speed each time the unloading step is actuated. At this stage the item is unloaded, by means of the impulses of a fictitious encoder, impulses derived from the main encoder as a function of the unit speed.

By means of the pointers reset step (a register or item data index that locates the unit that is to perform the unloading) and the data control (destination, weight and sizes) the item is unloaded by sending voltage to the bars that feed the motor of the belt-unit. Once the item has been unloaded, the main encoder deactivates the unloading device, resets the pointers and takes voltage off the bus bars.

FIG. 5c refers to the carrying out of the test on the proper working of units.

Under the control of the main encoder the unit belt is actuated, and the accurancy speed is feedback controlled. The thus tested unit is either enabled or disabled as a function of the result of the previous control: actually, this means that a failure - if any - would cause the unit not to be utilized.

The operation ends as soon as the motor of the belt-unit has been turned off.

I claim:

1. A method for controlling the unloading operation in a sorting plant having a plurality of units that run in a feed direction along a fixed path, each unit having a moving belt for receiving items having different masses and motor means connected to the belt for moving the belt, each belt moving orthogonally to the feed direction in order to carry out the unloading operation of an item at an unloading station along the fixed path, the method comprising:
   measuring the actual velocity of the belt near the unloading station using an electric transducer operatively connected to the belt;
   using a signal generator to generate a selected desired velocity;
   comparing the measured velocity to the selected desired velocity for the belt to produce a difference signal which is a function of the mass of the item on the belt the signal generator being connected to the electric transducer for producing the difference signal; and
   controlling power being supplied to the motor means for moving the belt as a function of the difference signal.

2. A method according to claim 1, including measuring the velocity of each unit in the feed direction and modifying the desired velocity generated by the signal generator as a function of the velocity of the unit in the feed direction.

3. A method according to claim 2, wherein the electric transducer generates a sequence of electric impulses as a function of the belt velocity.

4. A method according to claim 1, wherein each unit comprises an idler roller engaged with the belt and rotatable for moving the belt, the electric transducer comprising a plurality of circumferentially spaced magnets connected to the idler roller and a plurality of magnetic field sensors connected to the unit for detected variations in magnetic flux caused by the magnets as the idler roller rotates in order to generate a signal corresponding to the actual velocity of the belt.

5. A method according to claim 4 including comparator means connected to the sensors and connected to a signal generator for generating a signal corresponding to the desired velocity, the comparator having an output carrying the difference signal.

6. A method according to claim 5 including a bus bar extending in the feed direction in the vicinity of the unloading station and contacts connected to the motor means and contactable with the bus bar for receiving the controlled power, the difference signal controlling the instant at which the controlled power is supplied to the motor means.

7. A apparatus for controlling the unloading function of items having different masses from a sorting plant having a plurality of units which are mounted for movement in a feed direction along a fixed path, each unit having a moving belt mounted for movement orthogonally to the feed direction in order to carry and unload an item, the apparatus comprising:

an idler mounted for rotation to each unit an operatively engaged with the belt of each unit for rotation with movement of the belt;

a plurality of circumferentially spaced magnets connected to the idler on the unit;

a plurality of sensors mounted to the unit and cooperating with the magnets for generating an actual velocity signal corresponding to the actual velocity of the belt, the actual velocity of the belt being a function of the mass of an item on the belt;

a signal generator for generating a signal corresponding to a desired velocity of the belt;

comparator means connected to the signal generator and to the signals for generating a difference signal corresponding to the difference between the actual and desired velocities of the belt; and motor means connected to the unit for driving the belt, said comparator means being connected to said motor means and operating to supply a signal to the motor means which is timed as a function of the difference signal which in turn is a function of the mass of an item on the belt, for controlling the trajectory of the item as it is unloaded from the belt.

8. A apparatus according to claim 7 including an unloading station positioned along the fixed path, said comparator means including a bus bar extending along the unloading station, the motor means including at least one contact for contacting the bus bar as the unit passes the unloading station, said comparator means including means for supplying a power signal to the bus bar at a time which is a function of the difference signal.

* * * * *

UNITED STATES PATENT AND TRADEMARK OFFICE
Certificate

Patent No. 4,938,335                                    Patented: July 3, 1990

On petition requesting issuance of a certificate for correction of inventorship pursuant to 35 U.S.C. 256, it has been found that the above identified patent, through error and without any deceptive intent, improperly sets forth the inventorship. Accordingly, it is hereby certified that the correct inventorship of this patent is:

Francesco Canziani, San Macario (Varese), Italy; and Attilio Soldavini, San Macario (Varese), Italy.

Signed and Sealed this Fourteenth Day of July, 1998.

WILLIAM E. TERRELL
*Supervisory Patent Examiner*
Art Unit 3615